(12) United States Patent
Ho (10) Patent No.: US 9,671,829 B2
(45) Date of Patent: Jun. 6, 2017

(54) TABLET COMPUTER

(71) Applicants: HEWLETT-PACKARD DEVELOPMENT COMPANY, L.P., Houston, TX (US); Chifu Ho, Shanghai (CN)

(72) Inventor: Chi-Fu Ho, Taipei (TW)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/898,002

(22) PCT Filed: Aug. 30, 2013

(86) PCT No.: PCT/CN2013/082715
§ 371 (c)(1),
(2) Date: Dec. 11, 2015

(87) PCT Pub. No.: WO2015/027483
PCT Pub. Date: Mar. 5, 2015

(65) Prior Publication Data
US 2016/0202733 A1    Jul. 14, 2016

(51) Int. Cl.
*G06F 1/16* (2006.01)
*H05K 5/00* (2006.01)
*H05K 7/00* (2006.01)

(52) U.S. Cl.
CPC .......... *G06F 1/1656* (2013.01); *G06F 1/1615* (2013.01); *G06F 1/1626* (2013.01); *G06F 1/1637* (2013.01); *G06F 1/1667* (2013.01); *G06F 1/1662* (2013.01)

(58) Field of Classification Search
CPC ..................................................... G06F 1/1656
USPC ............ 361/679.01, 679.02, 679.55, 679.59, 361/679.56
See application file for complete search history.

(56) References Cited

U.S. PATENT DOCUMENTS

| 5,375,076 A | * | 12/1994 | Goodrich | G06F 1/1626 361/679.17 |
| 6,788,527 B2 | | 9/2004 | Doczy et al. | |
| 7,136,282 B1 | * | 11/2006 | Rebeske | G06F 1/1616 345/1.1 |
| 7,742,290 B1 | | 6/2010 | Kaya | |
| 8,289,688 B2 | * | 10/2012 | Behar | G06F 1/162 361/679.27 |
| 2005/0052831 A1 | * | 3/2005 | Chen | G06F 1/1616 361/679.11 |

FOREIGN PATENT DOCUMENTS

| CN | 101943935 | 1/2011 |
| CN | 101957639 | 1/2011 |
| CN | 103064472 | 4/2013 |

* cited by examiner

*Primary Examiner* — Anthony Haughton
(74) *Attorney, Agent, or Firm* — HP Patent Department (57) ABSTRACT

A tablet computer including a main body and a keyboard. The main body includes a front side and a rear side, with a display screen on the front side. The keyboard is movable from a first position in which it projects outwardly from the front side of the main body to a second position to the rear of the main body.

15 Claims, 7 Drawing Sheets

TABLET COMPUTER

BACKGROUND

In recent years tablet computers have enjoyed increasing popularity. A tablet computer comprises a main body having a display screen. The display screen may be touch sensitive thus allowing user input by a finger or stylus etc. A processor, memory and/or storage device may be provided inside the main body, behind the display screen.

While touch input on the display screen is suitable for simple applications such as browsing the internet, many users prefer a conventional keyboard for more involved work such as word processing, writing long entails and producing content etc. Accordingly some tablet computers allow for a separate keyboard to be added as a peripheral. The separate keyboard may be connected to the tablet computer main body by a wired connection such as USB port, or a wireless connection such as Bluetooth or WLAN.

BRIEF DESCRIPTION OF THE DRAWINGS

Examples of the invention will now be described, by way of non-limiting example only, with reference to the accompanying drawings, in which.

DETAILED DESCRIPTION

According to an example of the present disclosure a tablet computer may comprise a main body comprising a front side and a rear side, with a display screen on the front side. The keyboard may be movable from a first position in front of the display screen to a second position to the rear of the main body. In this way the tablet computer may be used in a manner of a lap top computer when the keyboard is in the first position.

When the keyboard is in the second position the tablet computer is relatively convenient to hold or carry around as the keyboard is not a separate part. As the keyboard in the second position does not cover the display screen, the tablet computer may still be used when the keyboard is in the second position.

In one example the tablet computer may have a kickstand attached to the rear side of the main body and the kick stand may be retractable to a position in which it at least partially covers the keyboard When the keyboard is in the second position. This may help to protect the keyboard and/or improve the appearance of the tablet computer.

Figure 1:
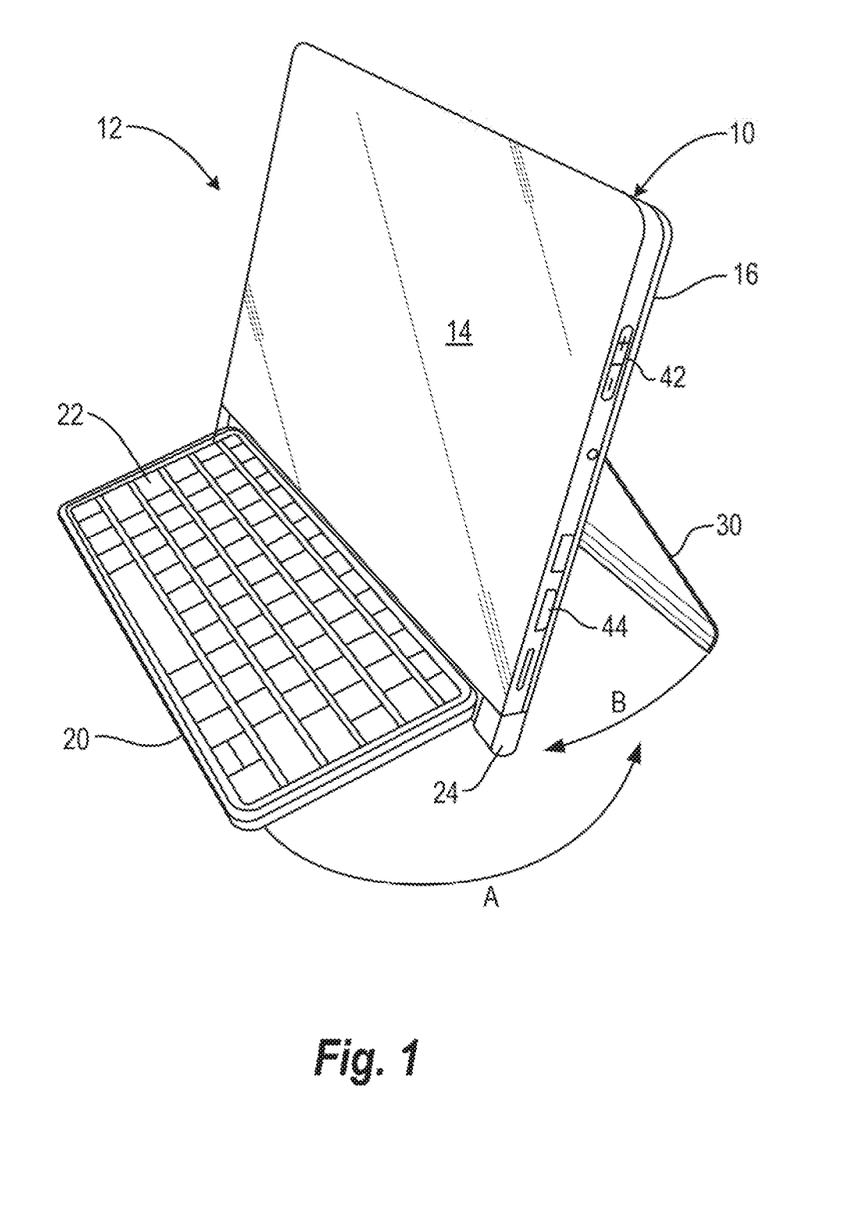
FIG. 1 is a perspective view from the front of an example of a tablet computer with a keyboard in a first position.
Figure 2:
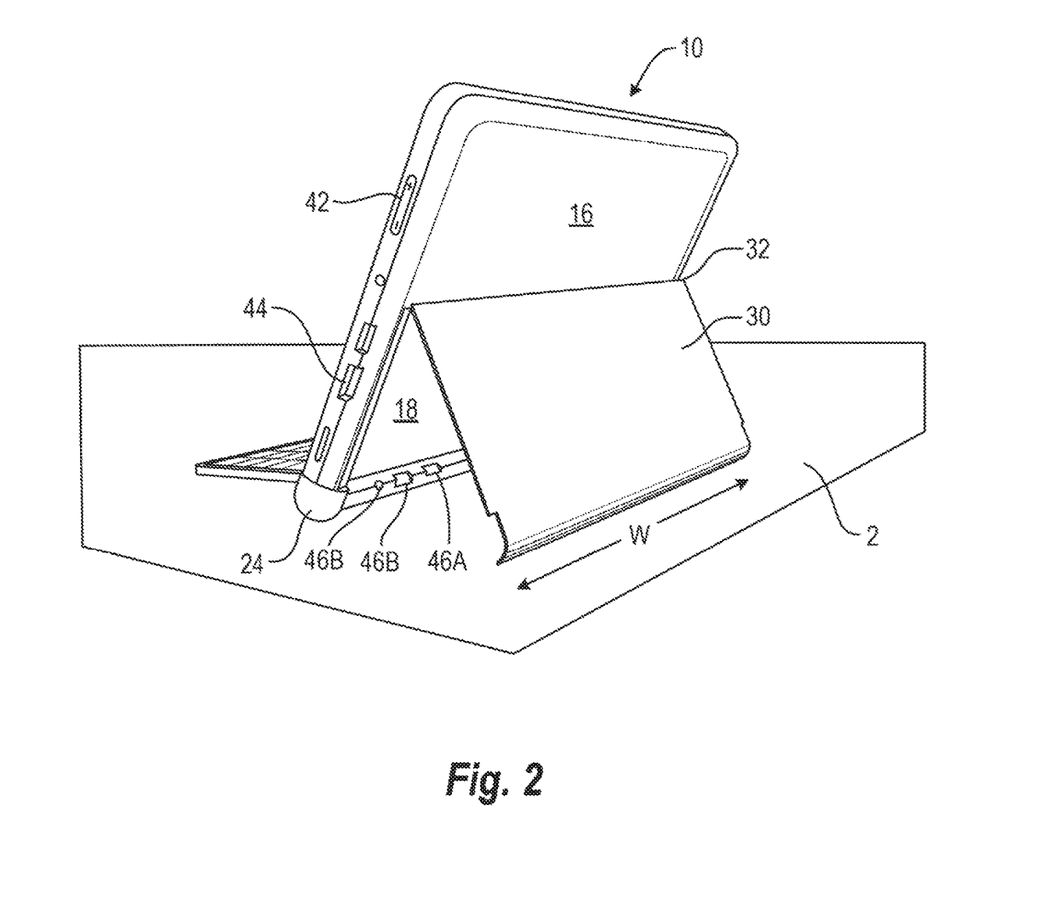
FIG. 2 is a perspective view from the rear of an example of a tablet computer with a keyboard in a first position.

FIG. 1 is a front perspective view of an example of a tablet computer according to the present disclosure. FIG. 2 is a rear perspective view of the same tablet computer. The tablet computer includes a main body 10 which has a front side 12 and a rear side 16. The front side includes a display screen 14 for displaying graphics, images, a user interface etc. The display screen 14 may for example be a LCD or OLED display etc. The display screen may be a touch sensitive screen or "touch screen" which allows user input by a finger or stylus etc.

A keyboard 20 is attached to the main body 10 of the tablet computer. The keyboard may be any suitable type of keyboard, for example a keyboard comprising a plurality of depressible keys, a thin capacitive or touch sensitive keyboard, an optical keyboard with optical sensors detecting key presses etc. The keyboard 20 is capable of adopting a first position in which it extends in front of the display screen 14 of the main body as shown in FIGS. 1 and 2. More specifically, by "in front of the display screen" it is meant that in the first position the keyboard projects outwardly from the front side 12 of main body. Thus in the first position the keyboard 20 is in an orientation such that a user may type on the keyboard while looking the display screen 14. The keyboard is attached to the main body 10 in such a way that it is movable from said first position to a second position to the rear of the main body, as will be described later.

A kick stand 30 may be attached to the rear side 16 of the main body. A "kick stand" is a device which acts as a support for the tablet computer. The kick stand may enable the tablet computer main body 10 to balance in a generally upright position relative to a surface 2, such as a desk or work area, on which the tablet computer is placed. The term "upright" means that the main body extends upwardly from the surface 2, but is not limited to any particular angle. In the example of FIGS. 1 and 2 the kick stand 30 supports the main body 10 in a generally upright position and the keyboard 20 extends in front of the display screen on the front side of the main body, so the tablet computer may be used in a manner similar to a laptop computer.

In FIGS. 1 and 2, the kick stand 30 adopts a position in which it projects outwardly from the rear side 16 of the main body 10 in order to support the main body. This may be referred to as the kick stand's first or "non-retracted" position, The kick stand 30 may be attached to the rear side 16 of the main body by a hinge 32, or by interfacing. with a groove on the rear side of the main body or otherwise.

Figure 4:
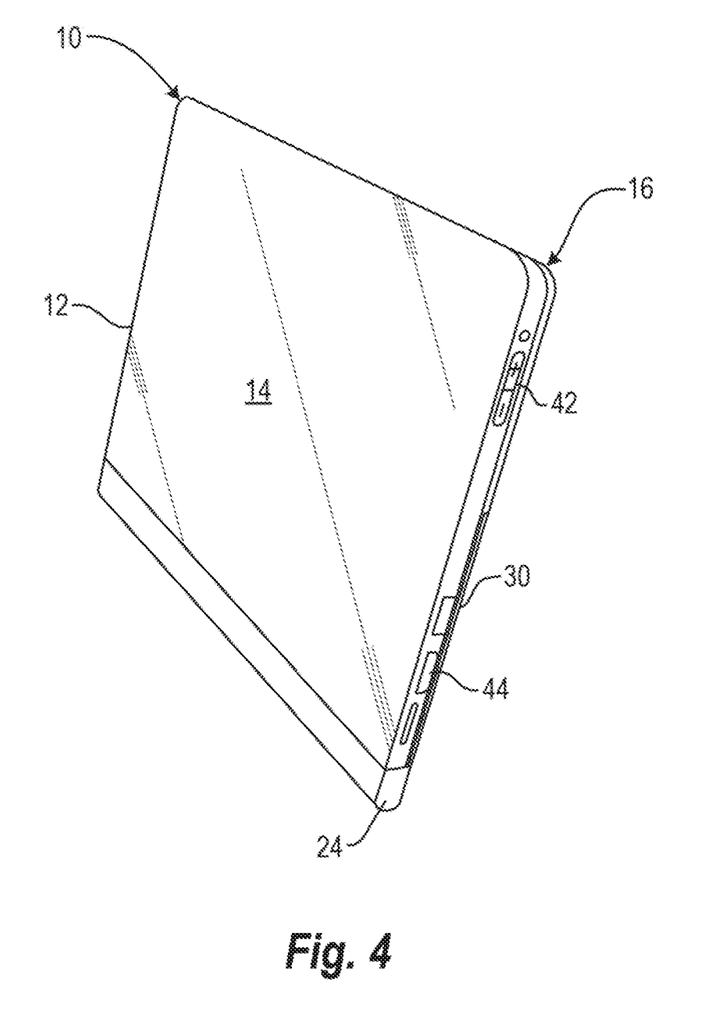
FIG. 4 is a perspective view from the front of the tablet computer with a keyboard in a second position and the kick stand in a retracted position.
Figure 5:
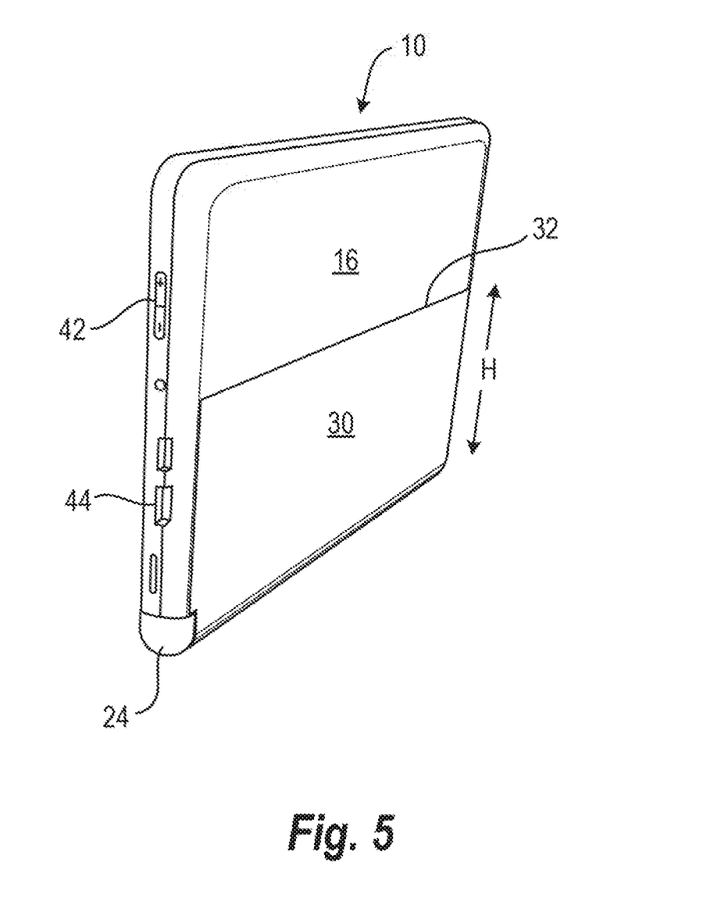
FIG. 5 is another perspective view from the rear of the tablet computer with a keyboard in a second position and the kick stand retracted.

Arrows A and B in FIG. 1 show how the tablet computer can be re-arranged from the "keyboard out" or laptop-like configuration of FIGS. 1 and 2 a "keyboard stowed" or tablet-like configuration as shown in FIGS. 4 and 5.

Figure 3:
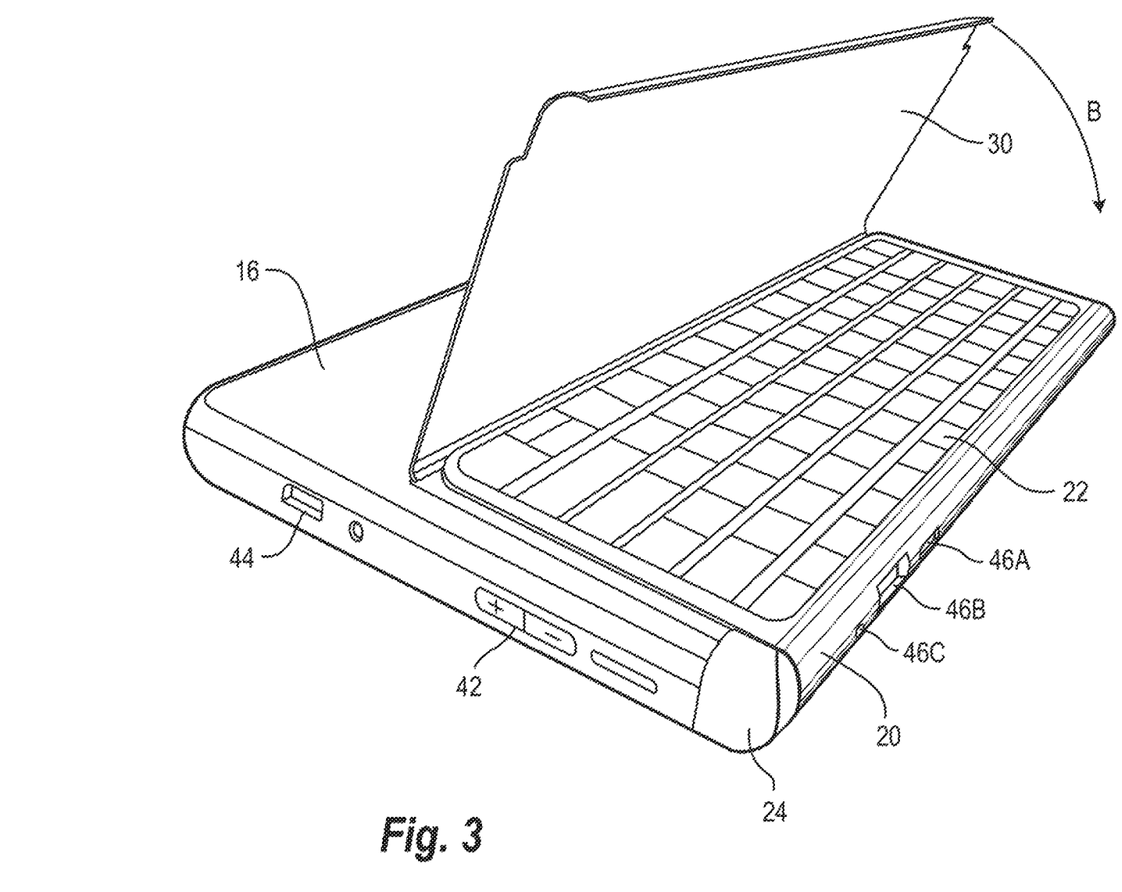
FIG. 3 is a perspective view from the rear of the tablet computer with the keyboard in a second position and a kick stand in a non-retracted position.

First, as indicated by arrow A, the keyboard 20 is moved from a first position in front of the display screen (e.g. as shown in FIG. 1) to a second position in which the keyboard faces, and in some cases may rest against, the rear side 16 of the main body (e.g. as shown in FIG. 3).

Figure 6:
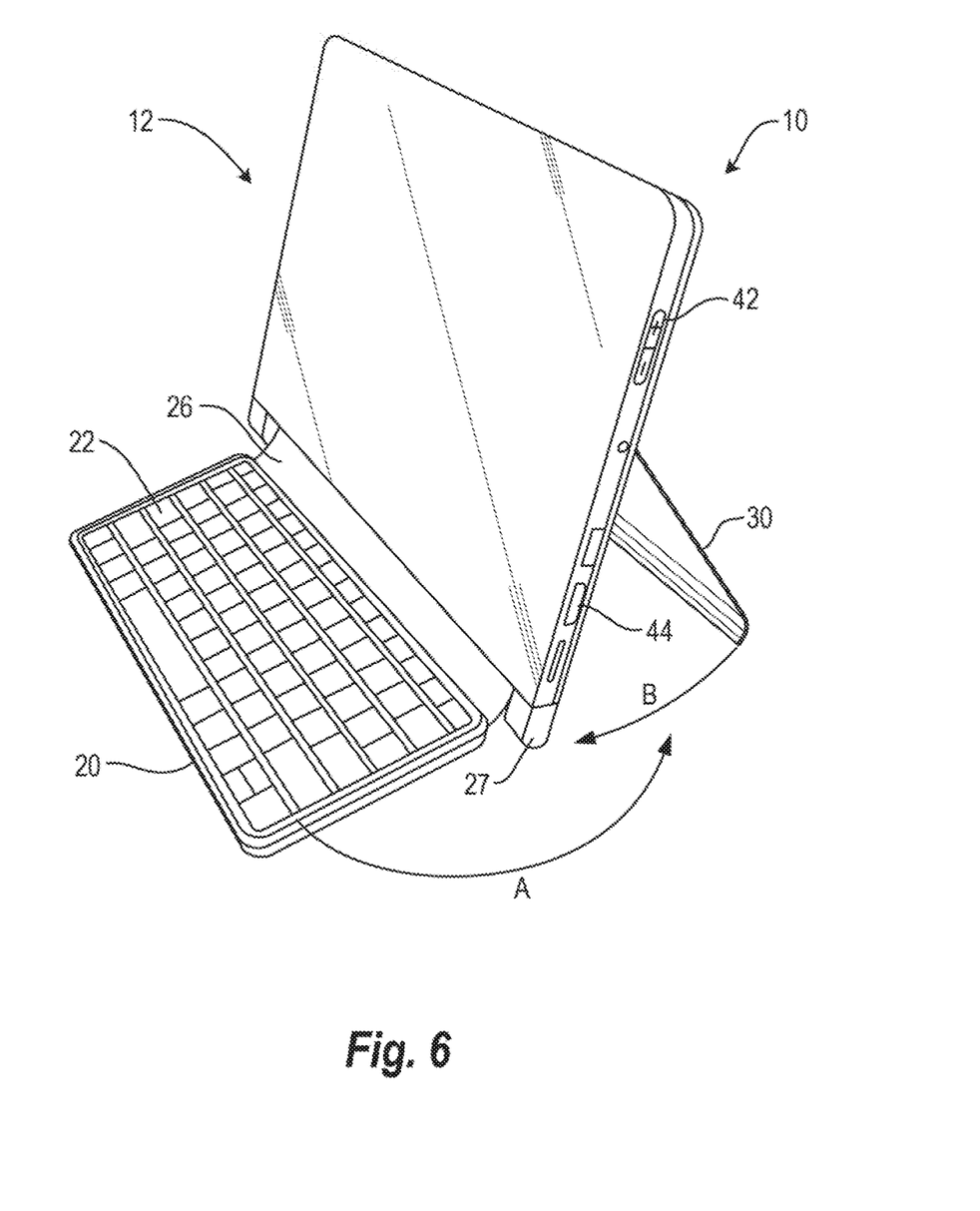
FIG. 6 is a perspective view from the front of another example of a tablet computer.

The keyboard may be attached to the main body in a manner which permits movement between the first and second positions without disconnecting the keyboard from the main body. For example the keyboard 20 may be attached to the main body 10 by a hinge 24 as shown in FIG. 1 or in any other convenient way which allows movement between the first and second positions. In the example of FIG. 6, which is otherwise the same as FIG. 1, the keyboard 20 is attached to the main body 10 by a piece of flexible material 26 such as fabric, cloth, plastic or rubber. In the FIG. 6 example there are two projections 27 to support the main body on a surface in a position above the keyboard in the first position, but in other examples the projections 27 need not be present and the main body can rest on its edge.

The keyboard 20 may have an I/O line such as a cable or other communicate on line, connecting the keyboard to the main body 10. Communication signals may thus be passed over the I/O line from the keyboard to the main body to communicate key presses and the like to the tablet computer. In some examples the line connecting the keyboard to the main body may be concealed from the user during normal use, for example by passing the I/O line through a hinge or piece of flexible material attaching the keyboard to the main body. An example of cables between the keyboard and main body is described in more detail later with reference to FIG. 7.

Whether the attachment of the keyboard to the main body is by a hinge, a flexible piece of material or otherwise, the movement of the keyboard 20 from the first position to the second position may be generally described as a rotation. The angle through which the keyboard is rotated depends upon its orientation in the first position. In many cases, in the first position the keyboard may be at approximately 90 to 110 degrees relative to the main body as shown in FIG. 1. In some examples the keyboard is moved through an angle of 200 degrees or more to reach the second position in which it faces the rear side of the main body. In the example of FIGS. 1-5 the keyboard is rotated through approximately 260-275 degrees to take it from the first position to the second position.

After the keyboard 20 has been moved to the second position (FIG. 3), the kick stand 30 may be retracted against the keyboard as shown by arrow 13 in FIGS. 1 and 3. Retracting the kick stand means moving the kick stand back towards the rear side of the main body. In the some examples, when the kick stand is in the retracted position it rests against the keyboard 20 which is in the second position. In the illustrated examples, the kick stand is an a first or "un-retracted" position in FIGS. 1-3, and the kick stand is in a second or "retracted" position in FIGS. 4 and 5. The kick stand 30 may have a snap fit interface with the rear side 16 of the main body when retracted. A snap fit may help maintain the kick stand in the retracted position until a user pulls it away and back to an un-retracted position.

FIG. 4 is a perspective view from the front of the example tablet computer in which the keyboard has been moved to the second position and the kick stand 30 has been retracted. FIG. 5 is a similar perspective view from the rear.

When the keyboard is in the second position, the tablet computer may form a relatively compact unit which is relatively easy to hold and/or carry around. Further, as they keyboard is out of the way of the display screen, e.g. it is not folded onto the front of the display screen, the tablet computer may still be used.

In one example when the keyboard 20 is moved to its second position its keys 22 will face outwardly away from the rear side of the main body. That is the keys will be exposed. However, when the kick stand 30 is moved to its retracted position it at least partially covers the keyboard and may thus afford some protection and/or prevent keys from being accidentally pressed. Further, in some examples the kickstand covering the keyboard when the keyboard is in the second position may improve the appearance and aesthetic of the tablet computer. In some examples, when retracted, the kick stand may help to retain the keyboard in the second position by preventing it from rotating back out to the first position.

In the illustrated example the kick stand 30 has an area greater than the area of the keyboard 20, so the kick stand 30 covers the entire keyboard when the keyboard is in the second position and the kick stand is retracted. The area of the keyboard relative to the main body may vary depending on the design; in many examples the keyboard will occupy an area between one third and three quarters of the rear side of the main body when in the second position. In the illustrated example the kick stand occupies an area equal to approximately half the rear side of the main body. In general the width of the kick stand W will be at least three quarters of the width of the main body. The height of the kick stand will also vary depending on the design, but may for instance be between one third the height of the main body and equal to the height of the main body. In the illustrated example the height H of the kick stand is approximately half the height of the main body. In the illustrated example the kick stand covers the entire keyboard when retracted. In other examples only a part of the keyboard may be covered, e.g. a bottom edge of the keyboard adjacent the hinges may remain exposed.

The rear side 16 of the main body may have a recess 18 which is equal in size or larger than the keyboard 22 and thus able to receive the keyboard 20 when the keyboard is moved to the second position. In the illustrated example the depth of the recess 18 is equal to or greater than the depth of the keyboard 20 so that the keyboard can fit within the recess without projecting out of the main body frame. in other examples the recess may be shallower or there may be no recess. In the illustrated example the kick stand 30 covers the entire recess 18 when the kick stand is retracted. Thus in the illustrated example, the keyboard 20 is effectively concealed one it has been moved into the recess and the kick stand has been retracted. In other examples, if the kick stand is transparent rather than opaque, or if the kick stand does not cover the entire keyboard, or if there is no recess, or if the recess extends right to the edge of the main body, then an edge, face or other parts of the keyboard may be visible to the user even after the kick stand has been retracted.

The tablet computer may have one or more I/O ports, In the illustrated example there is a plurality of I/O ports 44 on an edge of the main body and a plurality of I/O ports 46A, 46B and a power input 46C positioned on an edge of the keyboard. By putting some or all of the I/O ports on the keyboard instead of the main body, the exterior of the main body becomes less cluttered. This may improve the appearance of the tablet computer and may also help to prevent crowding of peripheral cables as the I/O ports may be distributed in different locations.

Figure 7:
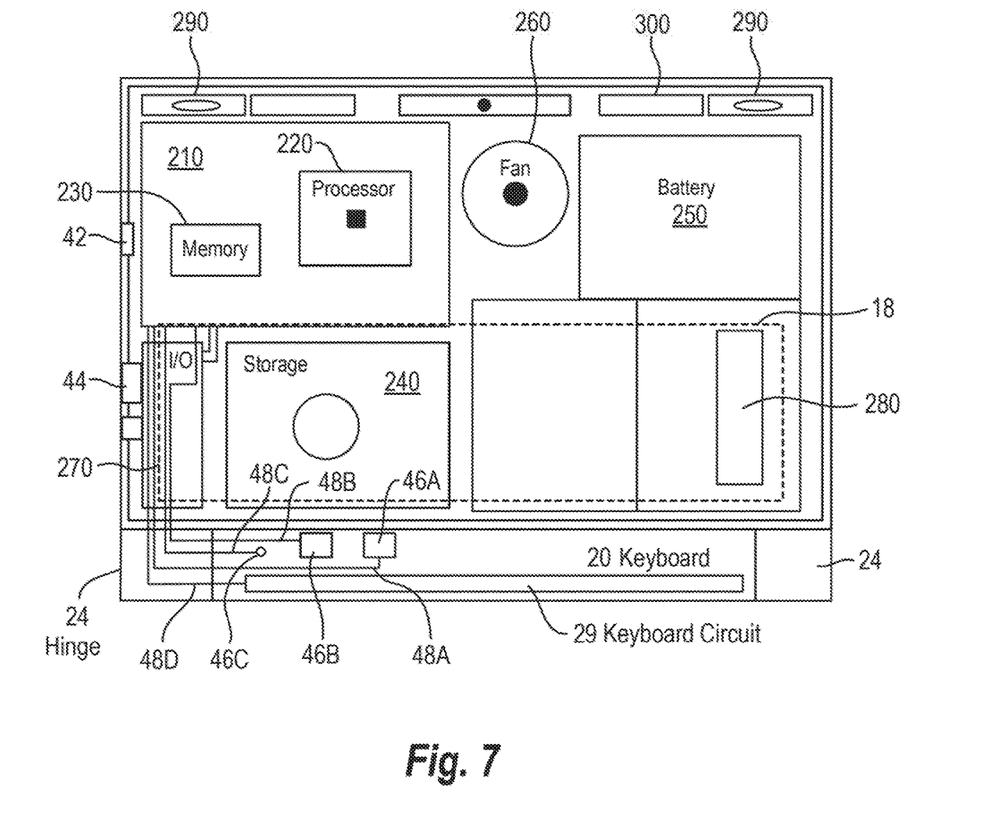
FIG. 7 shows a schematic view of the internal structure of an example tablet computer.

FIG. 7 is a schematic view of an example of an internal structure of the tablet computer main body and keyboard. The tablet computer main body comprises a processor 220 such as a CPU and a memory 230 such as RAM, which may be provided on a motherboard 210. The main body may thither include any or all of a storage device 240, such as a solid state or hard disk, a battery 250, an I/O board 270 for providing the I/O interfaces 44 and handling communication of signals to the processor or motherboard 210, a fan 260, a touch board 280 for detecting and processing touch input to the display screen, speakers 90 and an antenna 300 for wireless communication. The antenna 300 may be accompanied by circuitry for handing wifi 802.11 WLAN communication, and/or cellular 3G or LTE type communications etc.

The keyboard may have I/O ports such as a USB port 46A and a LAN port 46B and may have a power input 46C for connection to an external power source. These keyboard I/O ports and the power input may be connected by cable, wires or other suitable connections 48A, 48B, 48C to components in the main body such as motherboard 210. Further the keyboard may have a keyboard circuit 29 for sensing key presses and/or converting key presses to signals which may be communicated to the motherboard and processor by a keyboard I/O line 48D.

In the example of FIG. 7 the keyboard is mechanically connected to the main body by a pair of hinges 24. The power and I/O connections 48A-D from the keyboard may pass through the hinge and in this way they may be hidden from the user. In another example the keyboard may be attached to the main body by a piece of flexible material and the power and 110 connections may pass through the piece of flexible material. In still other examples the power and I/O connections may pass through another aperture in the main body casing.

In still other examples the power and 110 connections may be wireless using a technology such as Bluetooth, infra-red signaling or wifi etc, wireless charging etc, although such wireless connections may be more expensive than a wired connection.

In FIG. 7, the dotted lines 18 indicate a recess in an outer part of the main body which the keyboard 20 can fit into when moved to the second position. For example bulky items such as a fan or speakers may be placed in a different part of the main body out of the way of the recess 18, while compact devices such as the storage device 240, I/O board 270 and touch board 280 may be positioned beneath the recess.

Referring back to FIGS. 1-6, it should be noted that in the illustrated examples, when un-retracted the kick stand 30 supports the main body 10 and when retracted the kick stand acts as a kind of lid that at least partially covers and protects the keyboard in its second position, but the present disclosure is not limited to this and also includes other examples in which these functions may be carried out separately. For example, the tablet computer may have a separate lid, such as a removable slide-on lid, which is placed over the keyboard in its second position to protect the keyboard or improve the appearance. In that case the kick stand may be a separate device such as a V-shaped, L-shaped or other design or shape of stand or strut which is retractable against the main body and which is separate from the lid. In still other examples the tablet computer may not have a kick stand, but may have some other mechanism for supporting the main body in a generally upright position; e.g. the keyboard may have some weighting or a lock in the attachment to the main body which allows the main body to maintain the upright position. However, having a kick stand which is able to both support the main body and retract to protect the keyboard and/or improve the tablet computer appearance when the keyboard is in the second position, is an elegant design which may be achieved with a relatively small number of components and which may be relatively easy to manufacture.

While in the above examples the keyboard is continuously attached to the main body during its movement from the first position to the second position, in other examples the keyboard may be removably attached to the main body. For example the keyboard may be attached to the main body in the first position by a releasable lock mechanism, such as a latch, and the keyboard may be detached before placing the keyboard in the second position against the rear of the main body. The keyboard may then be secured in the second position by the same lock mechanism, or by a different lock mechanism, or simply held in place by the retracted kick stand or by a lid. In this case electrical power and any 110 communication between the keyboard when in the first position and the main body, and any I/O communication between I/O ports 46 of the keyboard and the main body, may pass through cables as described above, or through a docking, port of the main body which the keyboard connects to in the first position, or by an I/O or power connection which passes through the releasable lock mechanism or via any other suitable connection.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A tablet computer comprising:
   a main body, the main body having a front side and a rear side, a display screen on the front side and a kick stand attached to the rear side;
   a keyboard attached to the main body by a hinge and movable utilizing the hinge from a first position in which the keyboard projects outwardly from the front side of the main body to a second position in which the keyboard rests against the rear side of the main body, wherein the keyboard has an I/O port located on an upper edge of the keyboard;
   the kickstand being retractable to a position in which it at least partially covers the keyboard when the keyboard is in the second position, wherein the I/O port is exposed when the keyboard is in the first position and wherein the I/O port is blocked by the kickstand when the keyboard is in the second position and the kickstand is in the retracted position.

2. The tablet computer of claim 1 wherein the keyboard has a plurality of keys which face away from the rear side of the main body when the keyboard is in the second position.

3. The tablet computer of claim 1 wherein the rear side of the main body has a recess for receiving the keyboard when the keyboard is moved to the second position.

4. The tablet computer of claim 3 wherein the kick stand covers substantially the entire recess when retracted.

5. The tablet computer of claim 1 wherein the hinge includes a piece of flexible material.

6. The tablet computer of claim 1 wherein the kick stand has a snap fit arrangement with the main body when retracted.

7. The tablet computer of claim 1 wherein the keyboard is rotatable by more than 200 degrees from the first position to the second position.

8. The tablet computer of claim 1 wherein an area covered by the kick stand when the kick stand is retracted is greater than or equal to an area occupied by the keyboard in the second position.

9. The tablet computer of claim 1 wherein the I/O port is an I/O port to receive a USB connector, LAN line or other external connection, and wherein the I/O port is communicatively coupled to the main body of the tablet computer.

10. The tablet computer of claim 9 wherein the keyboard is attached to the main body by a hinge or piece of flexible material and wherein a connection between the I/O port and the main body passes through said hinge or said piece of flexible material.

11. The tablet computer of claim 1 wherein the keyboard is movable from the first position to the second position without disconnecting the keyboard from the main body.

12. A tablet computer comprising:
a main body, the main body including a display screen on a front side, a recess on a rear side and a processor and memory inside the main body;
a keyboard attached to the main body by a hinge and rotatable about the hinge from a first position in which a user may use the keyboard while viewing the display screen to a second position in which the keyboard fits into a recess in the rear side of the main body, wherein the keyboard has an I/O port located on an upper edge of the keyboard; and
a lid for covering the recess so as to protect the keyboard, wherein the I/O port is exposed when the keyboard is in the first position and wherein the I/O port is blocked by the lid when the keyboard is in the second position and the lid is covering the recess.

13. The tablet computer of claim 12 wherein the lid is a kick stand having a first position in which it extends away from the main body so that it can support the main body in an upright position and a second position in which the kick stand covers the recess.

14. A tablet computer comprising:
a main body including a display screen;
a keyboard attached to the main body by a hinge and rotatable about the hinge from a first position in which the keyboard projects outwardly from the front side of the main body to a second position in which the keyboard can rotate back and rest against the rear side of the main body, wherein the keyboard has an I/O port located on an upper edge of the keyboard;
a kickstand on the back of the main body, wherein in the second position the keyboard can be inserted in under the kickstand and the kickstand can be retracted against the keyboard, wherein the I/O port is exposed when the keyboard is in the first position and wherein the I/O port is covered by the kickstand when the keyboard is in the second position and the kickstand is retracted against the keyboard.

15. The tablet computer of claim 14 wherein the keyboard includes a keyboard circuit that is connected to the main body by an I/O line between the keyboard and the main body, said I/O line passing through a hinge or a piece of flexible material which attaches the keyboard to the main body.

* * * * *